United States Patent
Wang

(10) Patent No.: US 8,514,553 B2
(45) Date of Patent: Aug. 20, 2013

(54) DISPLAY WINDOW AND ELECTRONIC DEVICE EMPLOYING THE SAME

(75) Inventor: Qiang Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 114 days.

(21) Appl. No.: 12/781,949

(22) Filed: May 18, 2010

(65) Prior Publication Data

US 2011/0096477 A1    Apr. 28, 2011

(30) Foreign Application Priority Data

Oct. 28, 2009    (CN) .......................... 2009 1 0308996

(51) Int. Cl.
- *H05K 5/00* (2006.01)
- *H05K 7/00* (2006.01)
- *G06F 3/02* (2006.01)

(52) U.S. Cl.
USPC ............... 361/679.01; 361/679.2; 361/679.3; 361/679.55; 361/679.56; 345/168; 345/169; 345/170

(58) Field of Classification Search
USPC .............. 361/679.01–679.3, 679.55–679.59; 248/917–924
See application file for complete search history.

(56) References Cited

U.S. PATENT DOCUMENTS

| | | | | |
|---|---|---|---|---|
| 2002/0180907 A1* | 12/2002 | Imamura et al. | ............... | 349/112 |
| 2003/0184894 A1* | 10/2003 | Bischof et al. | ............... | 359/894 |
| 2008/0158173 A1* | 7/2008 | Hamblin et al. | ............... | 345/173 |

FOREIGN PATENT DOCUMENTS

WO    WO 2004114342 A1 * 12/2004

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

An electronic device employs a display window, which includes a substrate, a paint layer, and a background color layer. The substrate has a first surface and an opposite second surface. The second surface has a central portion and a peripheral portion. The paint layer is formed on the peripheral portion and partially covers the peripheral portion. The portions of the peripheral portion not covered by the paint layer are roughened. The background color layer is formed on the peripheral portion and at least covers the roughened portions.

12 Claims, 3 Drawing Sheets

DISPLAY WINDOW AND ELECTRONIC DEVICE EMPLOYING THE SAME

BACKGROUND

1. Technical Field

The present disclosure relates to display windows and electronic devices employing the same, particularly to a display window having a three-dimensional visual effect and an electronic device using the same.

2. Description of Related Art

Portable electronic devices such as mobile phones, laptops and personal digital assistants (PDA) are widely used. Generally, a portable electronic device includes at least one display, which is protected by a display window.

An ink layer is often printed on the periphery of the display window to decorate the electronic device or form a logo. However, the printed ink layer is a planar design and not a three-dimensional effect that would make the electronic device more attractive.

Therefore, there is room for improvement within the art.

BRIEF DESCRIPTION OF THE DRAWINGS

Many aspects of the present display window and electronic device employing the same can be better understood with reference to the following drawings. The components in the various drawings are not necessarily drawn to scale, the emphasis instead being placed upon clearly illustrating the principles of the present display window and electronic device employing the same. Moreover, in the drawings, like reference numerals designate corresponding parts throughout the diagrams.

DETAILED DESCRIPTION

Figure 1:
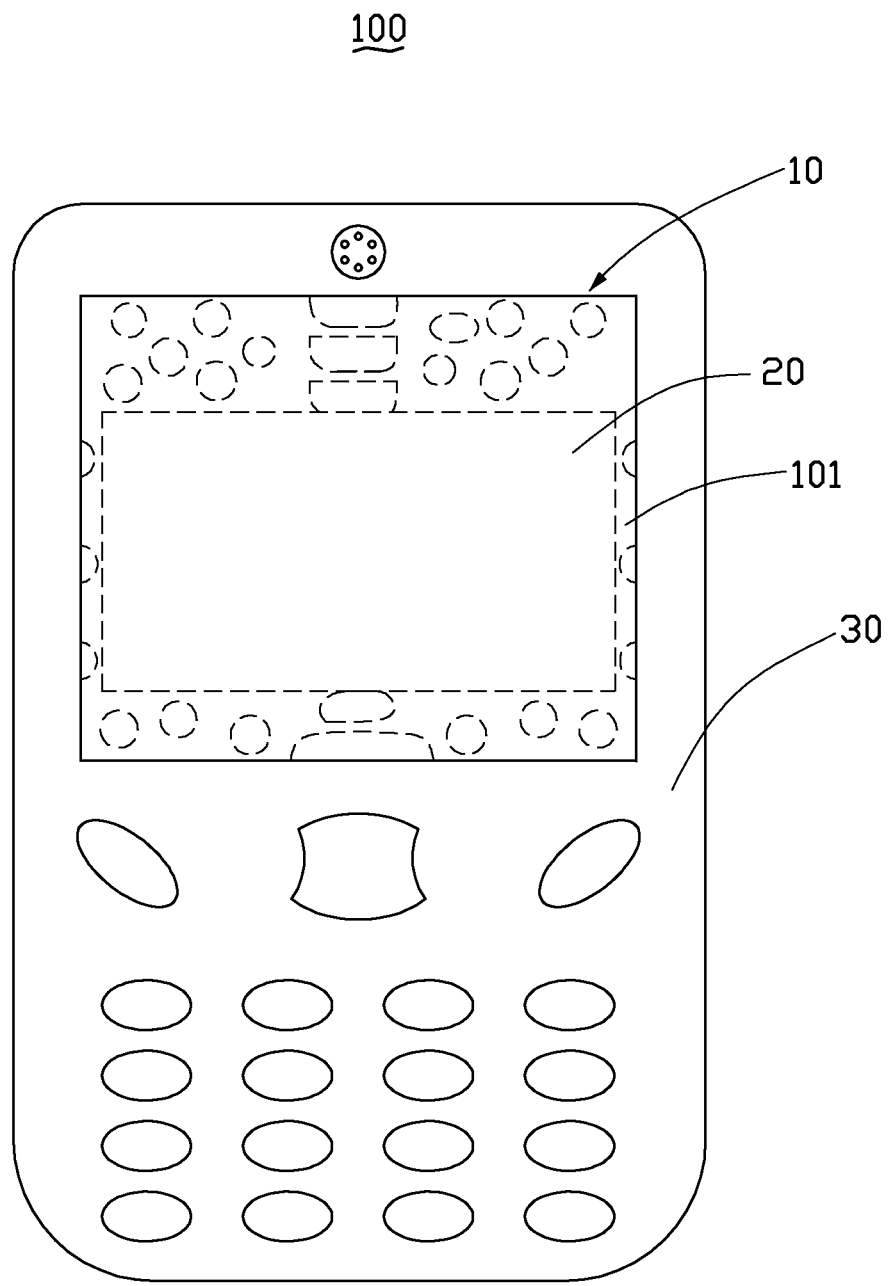
FIG. 1 is a schematic integral view of an electronic device according to an exemplary embodiment.

FIG. 1 shows an exemplary electronic device 100, such as a mobile phone, a personal digital assistant (PDA), a laptop, etc. The electronic device 100 includes a housing 30, a display 20, and a display window 10. The display 20 is received in the housing 30. The display window 10 is assembled on the housing 30 to cover and protect the display 20.

Figure 3:
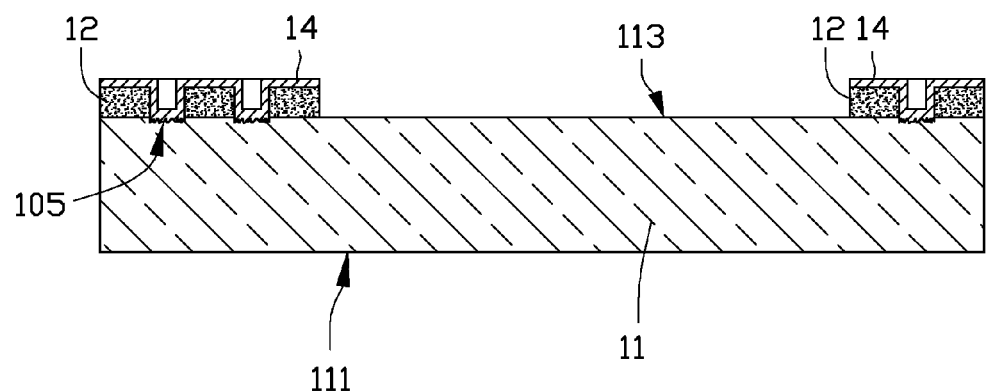
FIG. 3 is a schematic cross-section view of the display window shown in FIG. 2 taken along line III-III.

FIG. 3 further shows the display window 10 including a substrate 11, a paint layer 12, and a background color layer 14.

The substrate 11 can be made of transparent glass. The substrate 11 has a first surface 111 and an opposite second surface 113. When the display window 10 is mounted on the housing 30, the first surface 111 is the exposed (to the outside) surface and the second surface 113 is the inner surface, positioned facing the display 20.

Figure 2:
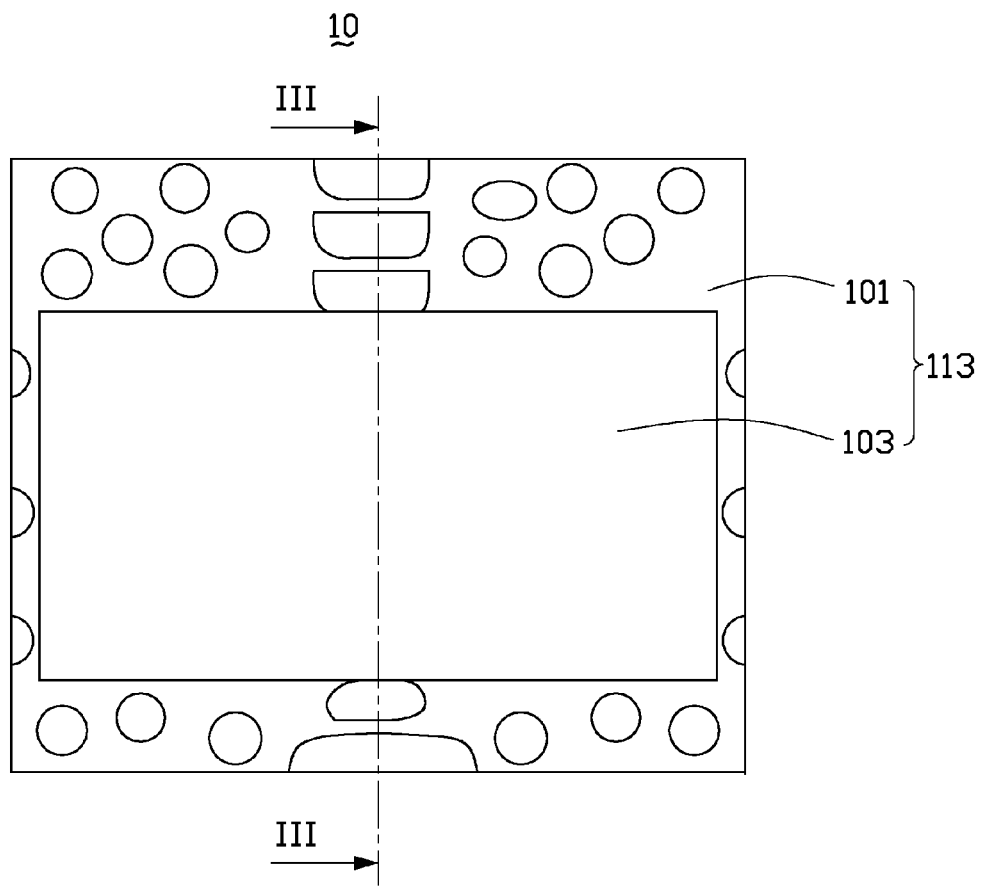
FIG. 2 is a schematic view of the rear of a display window according to an exemplary embodiment.

FIG. 2 further shows the second surface 113 includes a central display portion 103 and a decorative peripheral portion 101. The display portion 103 has a shape and size generally corresponding to the display 20. Accordingly, the display 20 can be viewed through the display portion 103.

The paint layer 12 is formed on the peripheral portion 101 and protrudes from the second surface 113 at a height of about 3~60 μm. The paint layer 12 partially covers the peripheral portion 101 and can form patterns, symbols, and characters thereon. The paint layer 12 can be made of ultraviolet curable paint having a first color. The color of the paint layer 12 can be changed by mixing dye therein. The portions of the peripheral portion 101 covered by the paint layer 12 have a smooth surface. Correspondingly, portions of the peripheral portion 101 not covered by the paint layer 12 are roughened portions 105 processed by, for example, abrasive blasting to form areas of relatively less reflectivity, which will aid in forming a 3D visual effect.

The background color layer 14 can be made of ink or paint having a second color, different from the color of the paint layer 12. The background color layer 14 is formed on the peripheral portion 101 and at least covers the roughened portions 105. In this exemplary embodiment, the background color layer 14 covers both the roughened portions 105 and the paint layer 12.

Portions of the peripheral portion 101 are smooth and appear bright, and the remaining portions of the peripheral portion 101 are rough and appear less bright. Furthermore, the paint layer 12 appears to protrude from the second surface 113. Accordingly, the three-dimensional ornamental effect of the electronic device 100 is achieved.

An exemplary method for making the display window 10 may include the following steps.

A clean vitreous substrate 11 is provided.

The paint layer 12 can be printed on the peripheral portion 101 of the substrate 11. The paint layer 12 partially covers the peripheral portion 101 and can form patterns, symbols, and characters thereon. The paint layer 12 can be ultraviolet curable paint in this exemplary embodiment. Once solidified by ultraviolet irradiation, the paint layer 12 has an enough thickness (generally of about 3~60 μm) to ensure it will not be easily worn away in the subsequent roughening process.

The display portion 103 of the second surface 113 is covered by a shield, preventing the display portion 103 from being damaged in the subsequent roughening process.

The second surface 113 is roughened, e.g., by abrasive blasting, thereby, the portions of the peripheral portion 101 not covered by the paint layer 12 are roughened to be the roughened portions 105.

The background color layer 14 is formed on the peripheral portion 101 and at least covers the roughened portions 105. In this exemplary embodiment, the background color layer 14 covers both the roughened portions 105 and the paint layer 12. The background color layer 14 may be a spray painted layer or a printed ink layer.

The shield is removed from the display portion 103 finishing the manufacturing of the display window 10.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display window, comprising:
   a transparent substrate, the substrate having a first surface and an opposite second surface, the second surface having a central portion and a peripheral portion;
   a paint layer formed on and contacting the peripheral portion and partially covering the peripheral portion, the portions of the peripheral portion not covered by the paint layer being roughened portions, the roughened portions reducing brightness viewed from the first surface; and a background color layer formed on the peripheral portion and at least covering the roughened portions, creating a 3D vision effect for the display window viewed from the first surface.

2. The display window as claimed in claim 1, wherein the paint layer forms patterns, symbols, and characters on the peripheral portion.

3. The display window as claimed in claim 1, wherein the paint layer protrudes from the second surface at a height of about 30~60 μm.

4. The display window as claimed in claim 1, wherein the paint layer and the background color layer have different colors.

5. The display window as claimed in claim 4, wherein the paint layer is made of ultraviolet curable paint.

6. An electronic device, comprising:
   a housing;
   a display received in the housing; and
   a display window assembled on the housing and covering the display, the display window including:
      a transparent substrate, the substrate having a first surface facing the display and an opposite second surface, the second surface having a central portion and a peripheral portion;
      a paint layer formed on and contacting the peripheral portion and partially covering the peripheral portion, the portions of the peripheral portion not covered by the paint layer being roughened portions, the roughened portions reducing brightness viewed from the first surface; and
      a background color layer formed on the peripheral portion and at least covering the roughened portions, creating a 3D vision effect for the display window viewed from the first surface.

7. The electronic device as claimed in claim 6, wherein the paint layer protrudes from the second surface at an altitude of about 30~60 μm.

8. The electronic device as claimed in claim 6, wherein the paint layer forms patterns, symbols, and characters on the peripheral portion.

9. The electronic device as claimed in claim 6, wherein the paint layer and the background color layer have different colors.

10. The electronic device as claimed in claim 9, wherein the paint layer is made of ultraviolet curable paint.

11. The display window as claimed in claim 1, wherein the paint layer and the background color layer are opaque, the background color layer is made of paint or ink.

12. The electronic device as claimed in claim 6, wherein the paint layer and the background color layer are opaque, the background color layer is made of paint or ink.

* * * * *